US009699745B2

(12) United States Patent
Harada et al.

(10) Patent No.: US 9,699,745 B2
(45) Date of Patent: Jul. 4, 2017

(54) RADIO COMMUNICATION SYSTEM AND COMMUNICATION CONTROL METHOD

(71) Applicant: NTT DOCOMO, INC., Chiyoda-ku (JP)

(72) Inventors: Hiroki Harada, Chiyoda-ku (JP); Yusuke Ohwatari, Chiyoda-ku (JP); Akihito Morimoto, Chiyoda-ku (JP); Yukihiko Okumura, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 12 days.

(21) Appl. No.: 14/403,788

(22) PCT Filed: May 15, 2013

(86) PCT No.: PCT/JP2013/063547
§ 371 (c)(1),
(2) Date: Nov. 25, 2014

(87) PCT Pub. No.: WO2014/013781
PCT Pub. Date: Jan. 23, 2014

(65) Prior Publication Data
US 2015/0156737 A1 Jun. 4, 2015

(30) Foreign Application Priority Data
Jul. 20, 2012 (JP) .................... 2012-161243

(51) Int. Cl.
*H04W 48/16* (2009.01)
*H04W 48/12* (2009.01)
(Continued)

(52) U.S. Cl.
CPC ......... *H04W 56/001* (2013.01); *H04W 16/32* (2013.01); *H04W 48/12* (2013.01); *H04W 48/16* (2013.01); *H04W 24/02* (2013.01)

(58) Field of Classification Search
CPC ......... H04W 36/0016; H04W 36/0022; H04W 36/0061; H04W 36/0083; H04W 36/04; H04W 36/24; H04W 36/30
See application file for complete search history.

(56) References Cited

U.S. PATENT DOCUMENTS 7,242,938 B2 * 7/2007 Kobylinski ........... H04W 36/26
455/436
7,961,707 B2 * 6/2011 Kim ....................... H04W 24/02
370/310

(Continued)

FOREIGN PATENT DOCUMENTS

EP 1 377 101 A1 1/2004
EP 1 912 458 A1 4/2008
(Continued)

OTHER PUBLICATIONS

International Search Report issued Aug. 20, 2013 in PCT/JP2013/063547 filed May 15, 2013.
(Continued)

*Primary Examiner* — Anthony Addy
*Assistant Examiner* — Martin Chang
(74) *Attorney, Agent, or Firm* — Oblon, McClelland, Maier & Neustadt, L.L.P.

(57) ABSTRACT

A radio communication system includes a user device, base stations, and a communication control device. The communication control device generates and reports, to the user device, selection information that is used to select base stations with which the user device should maintain synchronization. The user device selects, based on the selection information, base stations with which the user device should maintain synchronization. The user device reports, to the communication control device, identifiers of the selected base stations and received levels of radio waves transmitted (Continued)

from the base stations corresponding to the identifiers. The user device maintains synchronization with each of the selected base stations.

5 Claims, 7 Drawing Sheets

(51) Int. Cl.
*H04W 56/00* (2009.01)
*H04W 16/32* (2009.01)
*H04W 24/02* (2009.01)

(56) References Cited

U.S. PATENT DOCUMENTS

| | | | |
|---|---|---|---|
| 8,526,906 B1* | 9/2013 | Oroskar | H04W 52/0277 |
| | | | 455/343.1 |
| 2004/0185851 A1* | 9/2004 | Nagai | H04W 36/245 |
| | | | 455/436 |
| 2005/0079823 A1 | 4/2005 | Kurek et al. | |
| 2007/0184836 A1* | 8/2007 | He | H04W 52/0245 |
| | | | 455/434 |
| 2008/0070578 A1* | 3/2008 | Flore | H04W 56/0045 |
| | | | 455/438 |
| 2009/0047958 A1* | 2/2009 | Rimhagen | H04J 11/0093 |
| | | | 455/436 |
| 2009/0129341 A1 | 5/2009 | Balasubramanian et al. | |
| 2009/0170510 A1* | 7/2009 | Kim | H04W 36/30 |
| | | | 455/434 |
| 2010/0197298 A1* | 8/2010 | So | H04W 24/10 |
| | | | 455/424 |
| 2012/0015653 A1* | 1/2012 | Paliwal | H04W 24/10 |
| | | | 455/435.1 |
| 2013/0012212 A1 | 1/2013 | Murakami et al. | |
| 2014/0198676 A1* | 7/2014 | Han | H04W 24/10 |
| | | | 370/252 |

FOREIGN PATENT DOCUMENTS

| | | |
|---|---|---|
| JP | 2009-303221 A | 12/2009 |
| JP | 2010-028665 A | 2/2010 |
| JP | 2010-537478 | 12/2010 |
| JP | 2010-537478 A | 12/2010 |
| JP | 2012-070074 A | 4/2012 |
| WO | 2009/022967 A2 | 2/2009 |

OTHER PUBLICATIONS

Extended European Search Report issued Mar. 8, 2016 in Patent Application No. 13819287.7.
Office Action issued Dec. 2, 2014 in Japanese Patent Application No. 2012-161243 (with English translation).

\* cited by examiner

RADIO COMMUNICATION SYSTEM AND COMMUNICATION CONTROL METHOD

TECHNICAL FIELD

The present invention relates to radio communication systems and to communication control methods.

BACKGROUND ART

Recently, various radio communication systems that operate in accordance with 3GPP (Third Generation Partnership Project) protocols are used. In a radio communication system that operates in accordance with LTE/SAE (Long Term Evolution/System Architecture Evolution) protocol in the 3GPP protocols, multiple base stations can cooperate so as to perform radio communication with a user device. The above base stations include, for example, a large-scale radio base station (a macro base station), which has a large communicable region, and a small-scale radio base station (a pico base station, a femto base station, etc.), which has a smaller communicable region than a large-scale radio base station.

As an example of multiple base stations working in cooperation, Patent Document 1 discloses that by multiple femto base stations being grouped based on a geographical criterion (geographical closeness), a handover can be performed between a macro base station and the grouped femto base stations.

CITATION LIST

Patent Document

Patent Document 1: JP-A-2009-303221

SUMMARY OF INVENTION

Technical Problem

In the technology according to Patent Document 1 in which base stations are grouped based only on geographical location of the base stations, depending on communication conditions (e.g., quality of radio communication between a user device and a base station, traffic volume that a base station is to process, etc.), selection of base stations to be included in the group may not be appropriate. It is understood that the above issue resulting from fixed grouping may arise in a radio communication system including only radio base stations with the same scale (a so-called homogeneous network) as well as in a radio communication system including a large-scale radio base station and a small-scale radio base station (a so-called heterogeneous network).

Accordingly, it is an object of the present invention to appropriately select a base station that can perform radio communication with a user device in a radio communication system including multiple base stations.

Solution to Problem

A radio communication system according to the present invention includes: base stations that are identified by their respective identifiers; a user device that performs radio communication with each of the base stations; and a communication control device that controls radio communication between the base stations and the user device. The user device includes: a level measuring unit that measures received levels of radio waves transmitted from the base stations; and a storage unit that stores a first list and a second list, the first list including identifiers of base stations that are wirelessly communicable with the user device, the identifiers having been acquired by synchronization acquisition, the second list including identifiers of base stations with which the user device should maintain synchronization. The communication control device includes: a selection information generating unit that generates selection information that is used to select base stations with which the user device should maintain synchronization; and a selection information reporting unit that reports the selection information to the user device. The user device further includes: a base station selecting unit that selects, based on the selection information reported by the communication control device, base stations with which the user device should maintain synchronization from among base stations corresponding to the identifiers included in the first list so as to store identifiers of the selected base stations in the second list; a base station information reporting unit that reports, to the communication control device, the identifiers of the base stations selected by the base station selecting unit, the identifiers being included in the second list, and received levels of radio waves transmitted from the base stations corresponding to the identifiers; and a synchronization maintaining unit that maintains synchronization with each of the base stations corresponding to the identifiers included in the second list.

Preferably, the level measuring unit of the user device measures received levels of radio waves transmitted from each of the base stations corresponding to the identifiers included in the first list, the selection information generating unit of the communication control device generates, as the selection information, a maximum number of the identifiers that the second list is allowed to include, and the base station selecting unit of the user device selects, as the base stations with which the user device should maintain synchronization, base stations up to the maximum number of the identifiers indicated by the selection information in descending order of the received levels measured by the level measuring unit.

Preferably, the level measuring unit of the user device measures received levels of radio waves transmitted from each of the base stations corresponding to the identifiers included in the first list, the selection information generating unit of the communication control device generates, as the selection information, a maximum number of the identifiers that the second list is allowed to include, the user device further includes a determining unit that determines, based on a state of the user device, a maximum number of the identifiers that the second list is allowed to include, and the base station selecting unit of the user device selects, as the base stations with which the user device should maintain synchronization, base stations up to a number that is lesser of the maximum number of the identifiers indicated by the selection information and the maximum number of the identifiers determined by the determining unit in descending order of the received levels measured by the level measuring unit.

Preferably, the level measuring unit of the user device measures received levels of radio waves transmitted from each of the base stations corresponding to the identifiers included in the first list, the base station information reporting unit of the user device reports, to the communication control device, an identifier of a base station corresponding to a received level that is highest among the received levels measured by the level measuring unit, the selection information generating unit of the communication control device generates, based on the identifier reported by the base station information reporting unit of the user device, as the selection information, a candidate list of identifiers of base stations that the second list should include, and the base station selecting unit of the user device selects, as the base stations with which the user device should maintain synchronization, base stations that correspond to the identifiers indicated by the selection information.

Preferably, the level measuring unit of the user device measures received levels of radio waves transmitted from each of the base stations corresponding to the identifiers included in the first list, the base station information reporting unit of the user device reports, to the communication control device, an identifier of a base station corresponding to a received level that is highest among the received levels measured by the level measuring unit, the selection information generating unit of the communication control device generates, based on the identifier reported by the base station information reporting unit of the user device, as the selection information, a candidate list in which candidates for identifiers of base stations that the second list should include are listed in order of priority, the user device further includes a determining unit that determines, based on a state of the user device, a maximum number of the identifiers that the second list is allowed to include, and the base station selecting unit of the user device selects, as the base stations with which the user device should maintain synchronization, from among base stations that correspond to the identifiers indicated by the selection information, base stations up to the maximum number of the identifiers determined by the determining unit in order of the priority indicated by the selection information.

Preferably, the level measuring unit of the user device measures received levels of radio waves transmitted from the base stations corresponding to the identifiers included in the first list at a first frequence and measures received levels of radio waves transmitted from the base stations corresponding to the identifiers included in the second list at a second frequence, the second frequence being higher than the first frequence.

Preferably, the base stations includes: a first base station that forms a first cell; and a second base station that forms a second cell that has a radius smaller than the first cell, the second base station is connected to the communication control device, and the communication control device controls radio communication between the second base station and the user device.

Preferably, the first base station performs radio communication with the user device using radio waves of a first frequency band, and the second base station performs radio communication with the user device using radio waves of a second frequency band, the second frequency band being higher in frequency than the first frequency band.

A communication control method according to the present invention is for a radio communication system that includes: base stations that are identified by their respective identifiers; a user device that performs radio communication with each of the base stations; and a communication control device that controls radio communication between the base stations and the user device. The communication control method includes: in the user device, measuring received levels of radio waves transmitted from the base stations, and storing a first list and a second list, the first list including identifiers of base stations that are wirelessly communicable with the user device, the identifiers having been acquired by synchronization acquisition, the second list including identifiers of base stations with which the user device should maintain synchronization, in the communication control device, generating selection information that is used to select base stations with which the user device should maintain synchronization and reporting the selection information to the user device, in the user device, selecting, based on the selection information reported by the communication control device, base stations with which the user device should maintain synchronization from among base stations corresponding to the identifiers included in the first list so as to store identifiers of the selected base stations in the second list; reporting, to the communication control device, the identifiers of the base stations included in the second list and received levels of radio waves transmitted from the base stations corresponding to the identifiers, and maintaining synchronization with each of the base stations corresponding to the identifiers included in the second list.

Advantageous Effects of Invention

According to the present invention, based on selection information reported from the communication control device, base stations with which the user device should maintain synchronization are selected from among base stations that can perform radio communication with the user device and whose identifiers are acquired by synchronization acquisition (base stations corresponding to identifiers included in the first list). Therefore, base stations can be selected based on the selection information and more appropriately.

DESCRIPTION OF EMBODIMENTS

First Embodiment 1-1. Configuration of Radio Communication System

Figure 1:
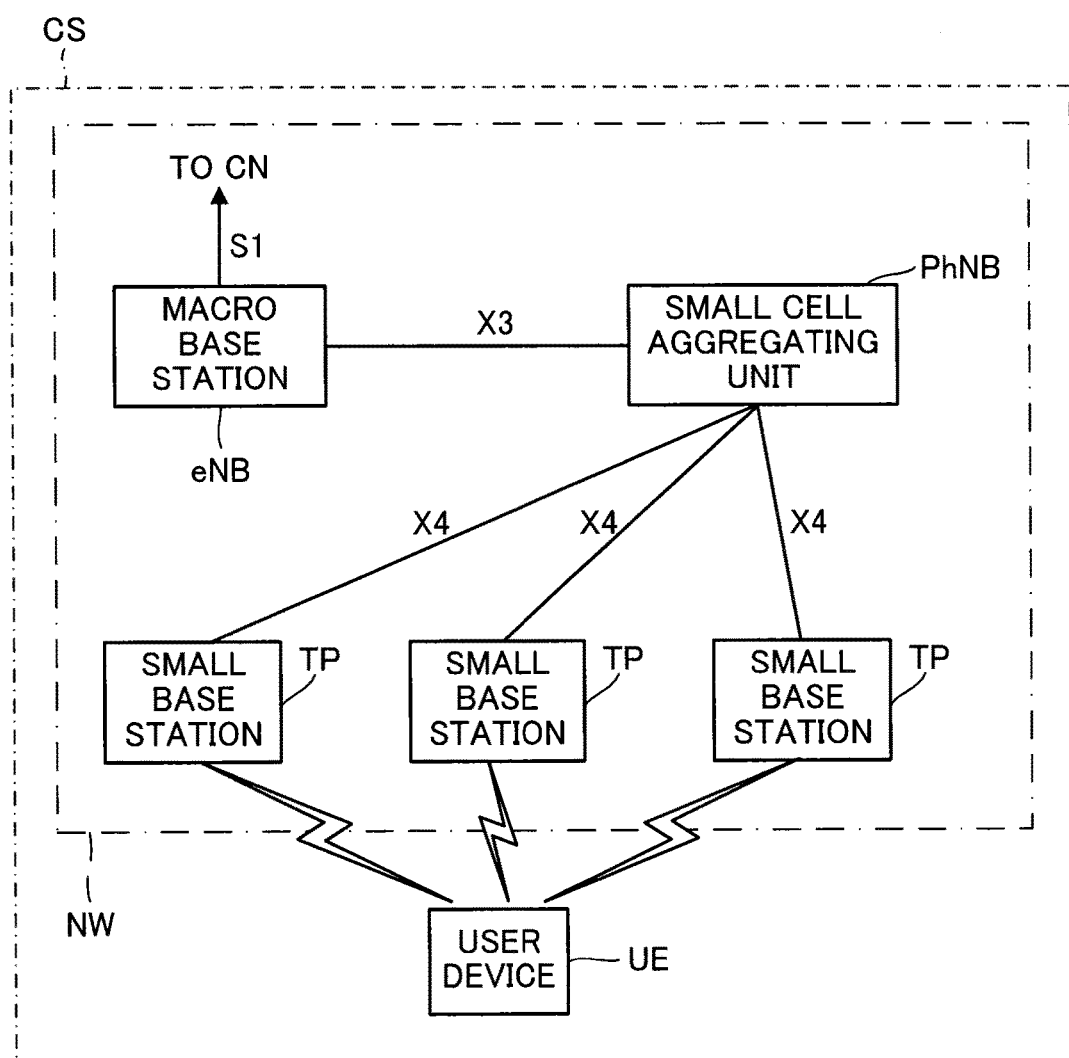
FIG. 1 is a block diagram illustrating a radio communication system according to a first embodiment of the present invention.

FIG. 1 is a block diagram illustrating a radio communication system CS according to a first embodiment of the present invention. The radio communication system CS includes, as its elements, a macro base station eNB, small base stations TP, a small cell aggregating unit PhNB, and a user device UE (hereinafter, the macro base station eNB and the small base stations TP may be generically referred to as base stations NB). The radio communication system CS may include elements other than the elements above; for example, a switching center, a serving gateway, and a PDN gateway, etc. A network NW may include all the above-mentioned elements that the radio communication system CS includes, except for the user device UE.

Each element in the radio communication system CS performs communication in accordance with a predetermined access technology, e.g., the LTE/SAE (Long Term Evolution/System Architecture Evolution) protocol in the 3GPP (Third Generation Partnership Project) protocols. In accordance with terms specified in the 3GPP protocols, the user device UE is a User Equipment, the macro base station eNB is an evolved Node B, the switching center is a Mobile Management Entity, the serving gateway is a Serving Gateway, and the PDN gateway is a Packet Data Network Gateway. The small base stations TP (transmission point) are base stations that are different from the macro base station eNB and are of a new type. The small cell aggregating unit PhNB (phantom Node B) is a new communication control device that controls radio communication between the small base stations TP and the user device UE (details below).

In the present embodiment, the radio communication system CS basically operates in accordance with LTE/SAE; however, it is not intended to limit the technical scope of the present invention. The present invention is applicable to other communication technologies when design modifications necessary for the present embodiment are made.

The user device UE can perform radio communication with the macro base station eNB and with the small base stations TP. A scheme for radio data transmission between the user device UE and the base stations NB can be chosen freely. For example, OFDMA (Orthogonal Frequency Division Multiple Access) may be adopted for downlink, whereas SC-FDMA (Single-Carrier Frequency Division Multiple Access) may be adopted for uplink. A configuration may be adopted in which the macro base station eNB uses a radio communication scheme (e.g., LTE, LTE-Advanced, etc.) that is different from a radio communication scheme that the small base stations TP use.

The macro base station eNB and the small base stations TP are connected to the small cell aggregating unit PhNB. The small cell aggregating unit PhNB and the user device UE communicate with each other (e.g., exchange control signals) through the macro base station eNB or through one of the small base stations TP. The macro base station eNB can be connected to an upper node (the switching center, the serving gateway, etc.) in a core network (e.g., Evolved Packet Core specified in the 3GPP protocols). Connections described above are typically by wire; however, they may be by radio.

With respect to a logical interface, an S1 interface exists between the macro base station eNB and the upper node, an X3 interface exists between the macro base station eNB and the small cell aggregating unit PhNB, and an X4 interface exists between the small cell aggregating unit PhNB and each of the small base stations TP. An S1 interface has already been specified in the 3GPP protocols (e.g., 3GPP TS 36.300 V10.6.0 (2011-12) 4.6.3 Interfaces). An X3 interface and an X4 interface are interfaces that have not been specified in the 3GPP protocols, and are based on an X2 interface that has already been specified as an interface between macro base stations eNB. It is understood that the names specified above as an X3 interface and an X4 interface are tentative and that other names may be adopted in the future.

Nodes in the radio communication system CS have their respective unique identification information. Identification information of a node can include an IP address, a TEID (tunnel endpoint identifier), etc., of the node. Identification information of the macro base station eNB can include a physical cell identity PCI used to identify a cell C formed by the macro base station eNB. Identification information of the small cell aggregating unit PhNB can include physical cell identities PCI used to identify cells C formed by small base stations TP held by the small cell aggregating unit PhNB. Identification information of a small base station TP can include a transmission point identity TPI used to identify a cell C formed by the small base station TP. As a transmission point identity TPI of a small base station TP, a physical cell identity PCI may be used. An IP address of a node is an address value that uniquely identifies the node in the radio communication system CS. A TEID is an identifier that identifies an endpoint of a bearer that logically connects nodes. The nodes in the radio communication system CS can, based on identification information of another node, identify the other node and can exchange signals with the identified node.

Figure 2:
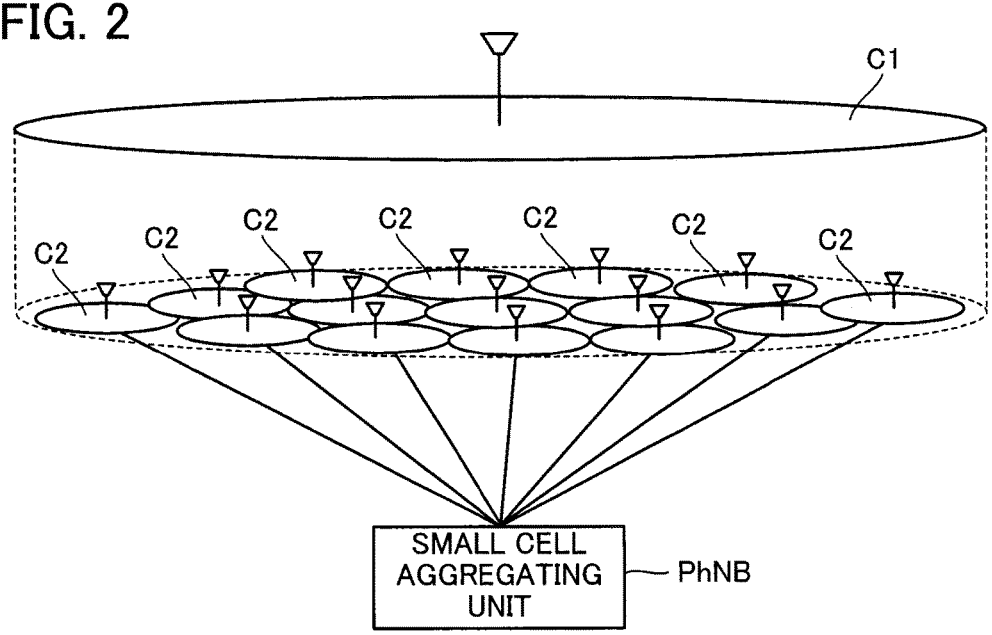
FIG. 2 is a drawing illustrating an example of cells that base stations form around themselves.

FIG. 2 illustrates an example of cells C that base stations NB form around themselves. The macro base station eNB forms a macro cell C1 around it and the small base stations TP form small cells C2 around them. An antenna of each base station is schematically shown in each cell C. For descriptive purposes, a plane on which the macro cell C1 is shown and a plane on which the small cells C2 are shown are illustrated separately. However, in reality, the macro cell C1 and the small cells C2 can be overlaid on the same plane (land surface, etc.). A cell C is a range within which radio waves from a base station NB reach the user device UE effectively. Therefore, the user device UE can perform radio communication with at least one base station NB corresponding to at least one cell C in which the user device UE is present. The small cell aggregating unit PhNB is connected to each of the small base stations TP and can perform scheduling (allocation of radio resources) of radio communication between the small base stations TP and the user device UE.

The small base stations TP are smaller in scale and have lower radio transmitting capabilities (average transmitting power, maximum transmitting power, etc.) than the macro base station eNB. A frequency band (a second frequency band, e.g., 3.5 GHz band) that the small base stations TP use for radio communication is higher in frequency and has greater propagation loss than a frequency band (a first frequency band, e.g., 2 GHz band) that the macro base station eNB uses for radio communication. Therefore, the small cells C2 have areas smaller than that of the macro cell C1.

Alternatively, a configuration may be adopted in which the macro base station eNB and the small base stations TP perform radio communication using a common frequency band.

1-2. Configuration of Each Element
1-2-1. Configuration of User Device

Figure 3:
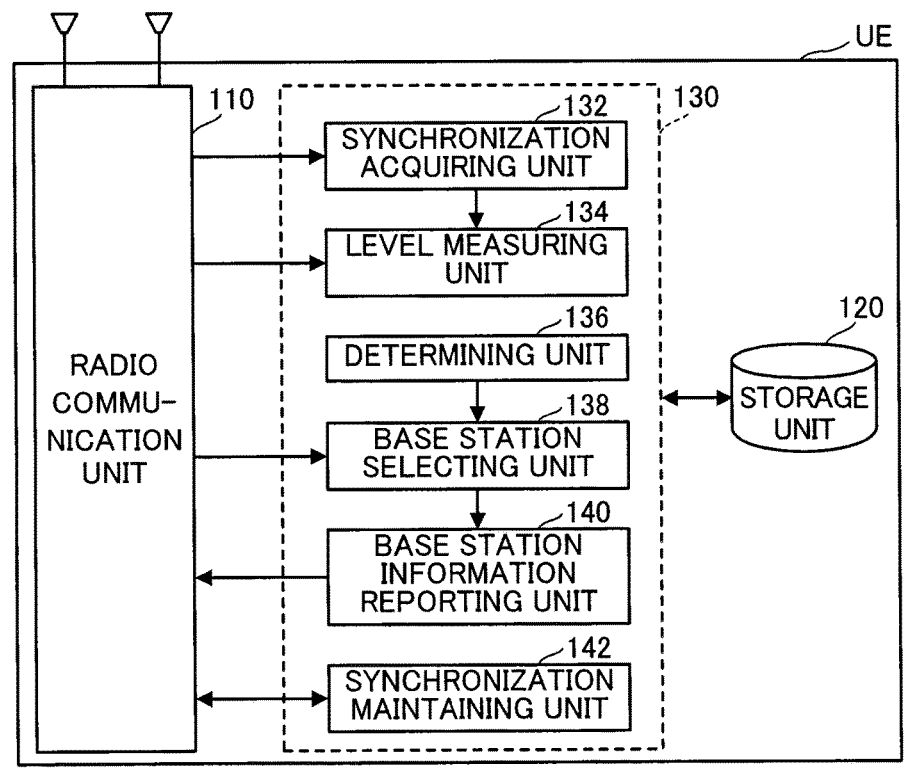
FIG. 3 is a block diagram illustrating a configuration of a user device according to the first embodiment.

FIG. 3 is a block diagram illustrating a configuration of the user device UE according to the first embodiment. The user device UE includes a radio communication unit 110, a storage unit 120, and a control unit 130. In the figure, the illustrations of an output device for outputting audio, images, etc., and an input device for accepting instructions from a user are omitted for brevity. The radio communication unit 110 is an element for performing radio communication with the macro base station eNB and with the small base stations TP, and includes transceiving antennas, a receiving circuit for receiving radio signals (radio waves) and converting them to electrical signals, and a transmitting circuit for converting electrical signals, such as control signals and user signals, to radio signals (radio waves) and transmitting them. The storage unit 120 stores information related to communication control, in particular, a first list L1 and a second list L2, each of which includes transmission point identities TPI of small base stations TP (details below). The control unit 130 includes a synchronization acquiring unit 132, a level measuring unit 134, a determining unit 136, a base station selecting unit 138, a base station information reporting unit 140, and a synchronization maintaining unit 142. Details of operations of each elements in the control unit 130 are described later. The control unit 130 and each element in the control unit 130 are functional blocks performed by a CPU (central processing unit; not shown) in the user device UE executing a computer program stored in the storage unit 120 and operating in accordance with the computer program.

1-2-2. Configuration of Macro Base Station

Figure 4:
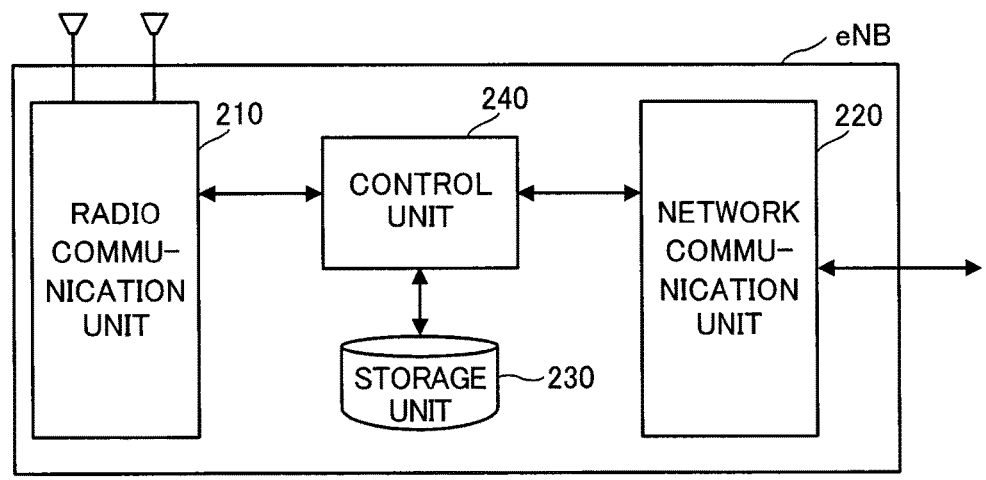
FIG. 4 is a block diagram illustrating a configuration of a macro base station according to the first embodiment.

FIG. 4 is a block diagram illustrating a configuration of the macro base station eNB according to the first embodiment. The macro base station eNB includes a radio communication unit 210, a network communication unit 220, a storage unit 230, and a control unit 240. The radio communication unit 210 is an element for performing radio communication with the user device UE, and has a configuration similar to that of the radio communication unit 110 of the user device UE. The network communication unit 220 is an element for performing communication with other nodes (the small cell aggregating unit PhNB, the switching center, etc.) in the network NW, and exchanges electrical signals with the other nodes. The storage unit 230 stores information related to communication control. The control unit 240 controls communication performed by the radio communication unit 210 and by the network communication unit 220. For example, the control unit 240 controls the radio communication unit 210 so as to transmit the physical cell identity PCI of its own station using a control channel. The control unit 240 is a functional block performed by a CPU (not shown) in the macro base station eNB executing a computer program stored in the storage unit 230 and operating in accordance with the computer program.

1-2-3. Configuration of Small Base Station

Figure 5:
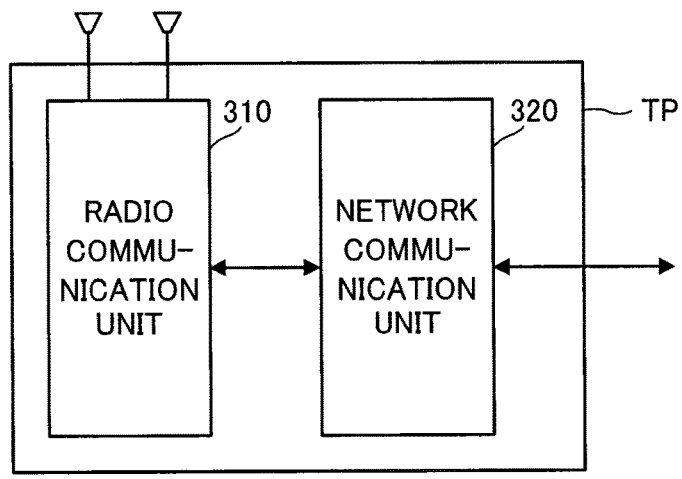
FIG. 5 is a block diagram illustrating a configuration of a small base station according to the first embodiment.

FIG. 5 is a block diagram illustrating a configuration of one of the small base stations TP according to the first embodiment. A small base station TP includes a radio communication unit 310 and a network communication unit 320. The radio communication unit 310 is an element for performing radio communication with the user device UE, and includes transceiving antennas, a receiving circuit for receiving radio signals (radio waves) and converting them to electrical signals, and a transmitting circuit for converting electrical signals, such as control signals and user signals, to radio signals (radio waves) and transmitting them. The radio communication unit 310 can transmit the transmission point identity TPI of its own station as a radio signal. The network communication unit 320 is an element for performing communication with the small cell aggregating unit PhNB, and exchanges electrical signals with the small cell aggregating unit PhNB. That is, the small base stations TP have a function to convert radio signals received from the user device UE to electrical signals and forward (transmit) them to the small cell aggregating unit PhNB and a function to convert electrical signals received from the small cell aggregating unit PhNB to radio signals and forward (transmit) them to the user device UE.

It is understood as a matter of course that when the small base stations TP and the small cell aggregating unit PhNB are connected by radio, the network communication unit 320 may be omitted.

1-2-4. Configuration of Small Cell Aggregating Unit

Figure 6:
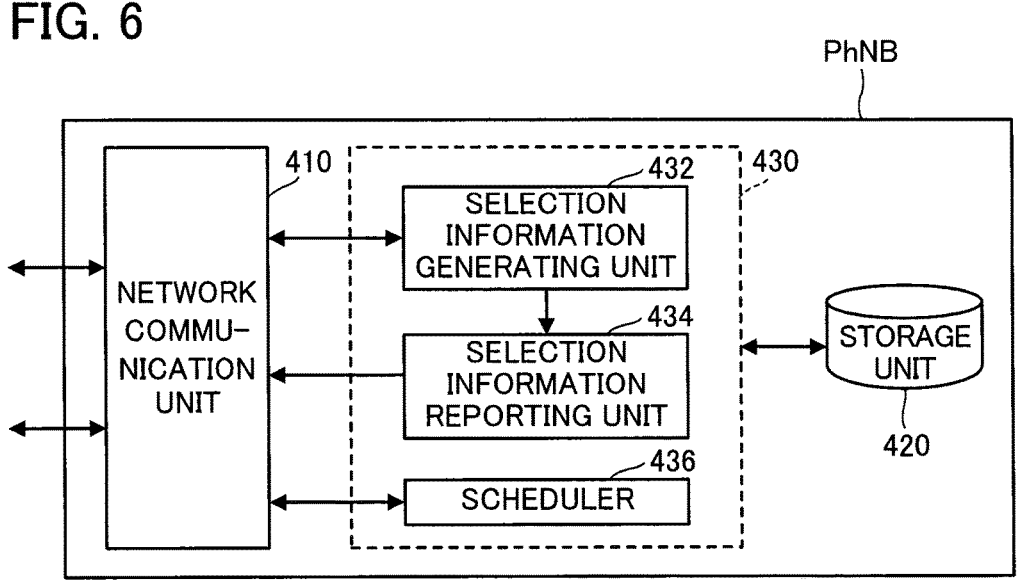
FIG. 6 is a block diagram illustrating a configuration of a small cell aggregating unit according to the first embodiment.

FIG. 6 is a block diagram illustrating a configuration of the small cell aggregating unit PhNB according to the first embodiment. The small cell aggregating unit PhNB includes a network communication unit 410, a storage unit 420, and a control unit 430. The network communication unit 410 is an element for performing communication with other nodes (the macro base station eNB, the small base stations TP, etc.) in the network NW. The network communication unit 410 has a configuration similar to that of the network communication unit 220 of the macro base station eNB. The storage unit 420 stores information related to communication control. The control unit 430 includes a selection information generating unit 432, a selection information reporting unit 434, and a scheduler 436. Operations of the above elements included in the control unit 430 are described later. In general, the control unit 430 collectively controls small base stations TP held by the small cell aggregating unit PhNB. The control unit 430 and each element included in the control unit 430 are functional blocks performed by a CPU (not shown) in the small cell aggregating unit PhNB executing a computer program stored in the storage unit 420 and operating in accordance with the computer program.

1-3-1. Dynamic Selecting Operation of Small Base Stations TP (First Example)

Figure 7:
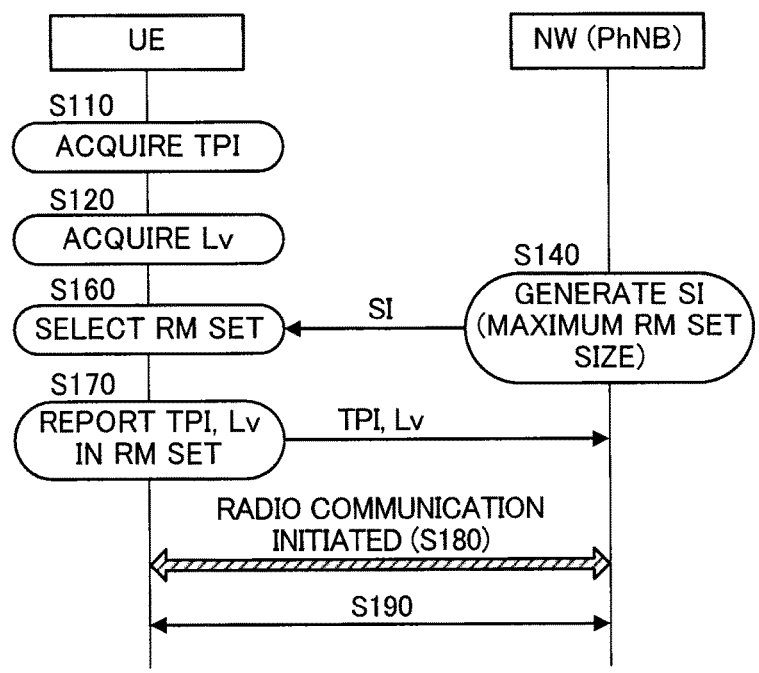
FIG. 7 is a diagram illustrating a first example of a dynamic selecting operation of small base stations according to the first embodiment.

With reference to FIG. 7, an example of a dynamic selecting operation of small base stations TP according to the present embodiment is described below. Hereinafter, a set of small base stations TP with which the user device UE should maintain synchronization may be referred to as an "RM set (resource management set)".

The user device UE receives radio waves transmitted from a small base station TP so as to perform synchronization acquisition, and acquires the transmission point identity TPI of the small base station TP so as to store it in the first list L1 in the storage unit 120 (S110). More specifically, the synchronization acquiring unit 132 of the user device UE performs correlation calculation between each of synchronization signal sequences stored in the storage unit 120 and a synchronization signal transmitted from the small base station TP so as to acquire, as the transmission point identity TPI of the small base station TP, a transmission point identity TPI indicated by the synchronization signal sequence in which a correlation peak is detected (i.e., the synchronization signal sequence that corresponds to the synchronization signal from the small base station TP). The above operation is performed for multiple small base stations TP whose radio waves the user device UE can receive. In the synchronization acquisition and acquisition of a transmission point identity TPI described above, a publicly known step-by-step method for synchronization (e.g., a synchronization method using primary synchronization signals and secondary synchronization signals in the LTE protocol) may be adopted.

A set of small base stations TP corresponding to transmission point identities TPI stored in the first list L1 is a set of small base stations TP that can perform radio communication with the user device UE. Hereinafter, the above-mentioned set of small base stations TP may be referred to as an "SCM set (small cell management set)".

Subsequently, the level measuring unit 134 of the user device UE measures received levels Lv (e.g., reference signal received power) of radio waves that are transmitted from each of the small base stations TP in the SCM set and are received by the radio communication unit 110 so as to store them in association with transmission point identities TPI of corresponding small base stations TP in the storage unit 120 (S120). As a result of performing the above steps S110 and S120, transmission point identities TPI of the small base stations TP that can perform radio communication with the user device UE and received levels Lv of radio waves from the small base stations TP are stored in association with each other in the storage unit 120.

The small cell aggregating unit PhNB generates selection information SI used to select a small base station TP with which the user device UE should maintain synchronization (a base station included in the RM set) and reports the selection information SI to the user device UE (S140). More specifically, the selection information generating unit 432 of the small cell aggregating unit PhNB generates, based on a state of the network NW, selection information SI that indicates the maximum number of small base stations TP that the RM set can include (i.e., the maximum number of transmission point identities TPI that the second list L2 can include; hereinafter, this may be referred to as the "maximum RM set size"). The selection information reporting unit 434 then reports (transmits) the generated selection information SI to the user device UE. The selection information SI may be set for each user device UE, for each small cell aggregating unit PhNB, or for any other unit (e.g., a predetermined set of user devices UE).

The "state of the network NW" to which the selection information generating unit 432 refers when generating selection information SI at step S140 can be freely chosen. For example, the maximum RM set size may be set smaller with increasing number of user devices UE that the scheduler 436, which is included in the small cell aggregating unit PhNB, is to control (i.e., with increasing processing loads on the scheduler 436). The maximum RM set size may be set greater with increasing moving speed of a user device UE to be supported. The maximum RM set size may be set smaller with increasing volume of communication traffic that the network NW side is to process. The maximum RM set size may be set based on criteria that include any of the above criteria.

The selection information SI is transmitted to the user device UE as a control signal. As stated before, the small cell aggregating unit PhNB (the selection information reporting unit 434) transmits control signals (selection information SI) to the user device UE through a base station NB. More specifically, control signals may be transmitted through a control plane (C-plane) established between the macro base station eNB and the user device UE. Control signals may be transmitted using a broadcast channel that a small base station TP uses to broadcast a broadcast signal to all user devices UE under its control. After step S120, a small base station TP with the highest received levels Lv of radio waves and the user device UE may establish radio connection with each other, and control signals may be transmitted through the small base station TP with which the radio connection has been established.

The base station selecting unit 138 of the user device UE selects, based on the selection information SI reported by the small cell aggregating unit PhNB, small base stations TP with which the user device UE should maintain synchronization (the RM set), and stores transmission point identities TPI of the selected small base stations TP in the second list L2 (S160). More specifically, the base station selecting unit 138 selects, in descending order of received levels Lv measured by the level measuring unit 134, small base stations TP up to the maximum RM set size indicated by the selection information SI, as small base stations TP with which the user device UE should maintain synchronization. For example, if the maximum RM set size indicated by the selection information SI is "5", the base station selecting unit 138 selects, from among small base stations TP included in the first list L1, five small base stations TP (the RM set) in descending order of measured received levels Lv and stores their transmission point identities TPI in the second list L2. When the number of transmission point identities TPI of small base stations TP included in the first list L1 (i.e., the number of small base stations TP included in the SCM set) is less than the maximum RM set size, the number of small base stations TP included in the RM set may be less than the maximum RM set size.

The base station information reporting unit 140 of the user device UE reports (transmits), to the small cell aggregating unit PhNB, the transmission point identities TPI that are selected at step S160 and are included in the second list L2 and the received levels Lv of radio waves transmitted from each of the small base stations TP corresponding to the above transmission point identities TPI (S170). The reported information (TPI, Lv) is provided to the scheduler 436. In addition to the above information, the number of transmission point identities TPI actually included in the second list L2 (hereinafter, this may be referred to as the "actual RM set size") may be reported to the small cell aggregating unit PhNB (the scheduler 436) and may be utilized for scheduling. Even if the actual RM set size is not explicitly reported, however, the small cell aggregating unit PhNB can acquire the "actual RM set size" that may be different from the maximum RM set size by counting the number of transmission point identities TPI reported. As can be understood from the description above, in the reporting operation at step S170, information indicating the actual RM set size is reported to the small cell aggregating unit PhNB explicitly or implicitly.

After step S170 is completed, under the control of the small cell aggregating unit PhNB (the scheduler 436), a connection process for the small base stations TP included in the RM set and the user device UE is performed, and radio communication is initiated (S180). While radio communication is being performed, the user device UE maintains synchronization with each of the small base stations TP included in the RM set (S190). In other words, while the user device UE is performing radio communication, in order to maintain synchronization with the small base stations TP that are in the RM set and include small base stations TP not performing radio communication with the user device, the synchronization maintaining unit 142 of the user device UE detects synchronization signals from each small base station TP continuously and updates receiving timing frequently. Additionally, while the user device UE is performing radio communication, the level measuring unit 134 frequently measures received levels Lv of radio waves from the small base stations TP included in the RM set, and the base station information reporting unit 140 reports the measured received levels Lv to the small cell aggregating unit PhNB.

1-3-2. Dynamic Selecting Operation of Small Base Stations TP (Second Example)

Figure 8:
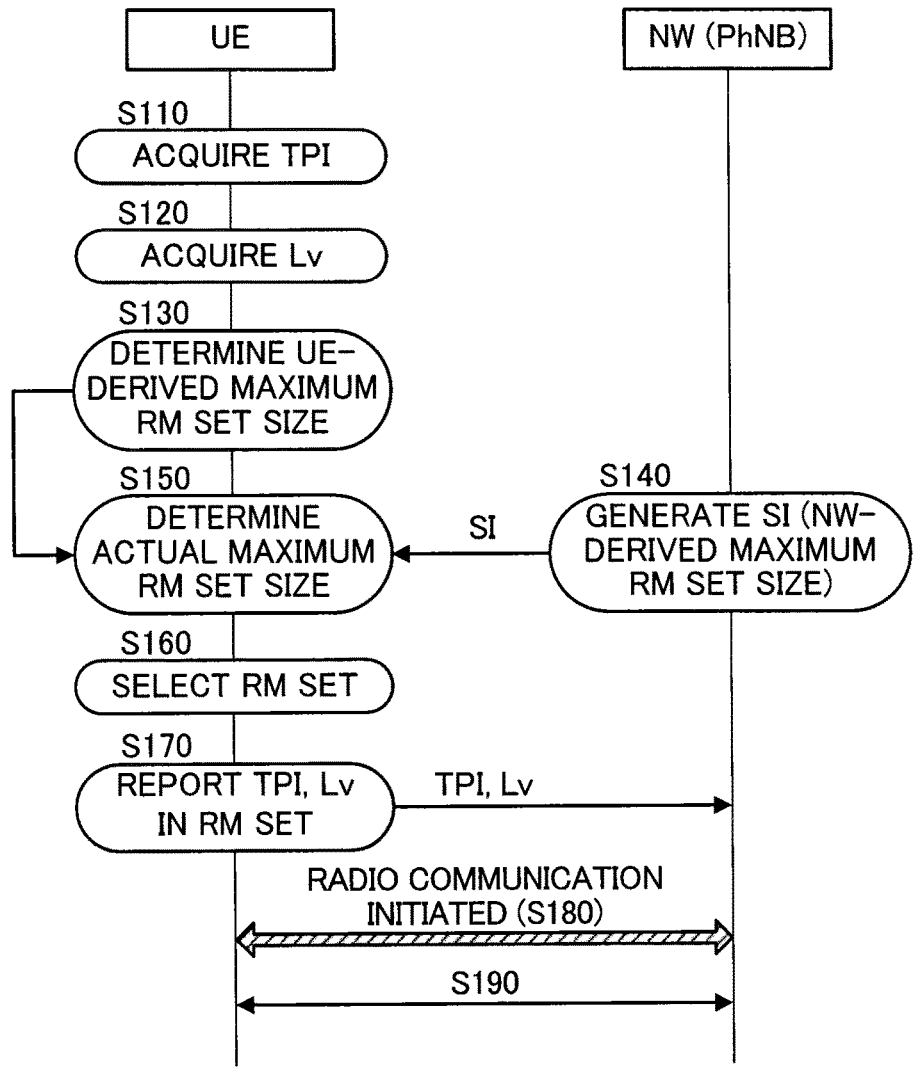
FIG. 8 is a diagram illustrating a second example of a dynamic selecting operation of small base stations according to the first embodiment.

FIG. 8 is another example (a second example) of a dynamic selecting operation of small base stations TP according to the present embodiment. Since operations at steps S110 and S120 are similar to those in the first example described above, description thereof is omitted.

After step S120 is completed, the determining unit 136 of the user device UE determines, based on a state of the user device UE, the maximum number of small base stations TP that an RM set can include (the maximum RM set size) (S130). The "state of the user device UE" to which the determining unit 136 refers when determining the maximum RM set size can be freely chosen. For example, the determining unit 136 may set the maximum RM set size smaller with lower remaining battery level of the user device UE so as to suppress a processing load for maintaining synchronization that the user device UE should perform. On the other hand, the determining unit 136 may set the maximum RM set size greater with greater processing capacities of the user device UE. The maximum RM set size may be set based on criteria that include any of the above criteria.

Generation of, and reporting of, selection information SI (the maximum RM set size) to the user device UE by the small cell aggregating unit PhNB at step S140 are as described in the first example. That is, after step S140 is completed, the user device UE is to have both the maximum RM set size that is determined at step S130 and is based on the state of the user device UE (hereinafter, this may be referred to as the "UE-derived maximum RM set size") and the maximum RM set size that is generated at step S140 and is based on the state of the network NW (hereinafter, this may be referred to as the "NW-derived maximum RM set size").

The base station selecting unit 138 of the user device UE determines the smaller of the NW-derived maximum RM set size and the UE-derived maximum RM set size as the actual maximum RM set size (S150). Then, the base station selecting unit 138 selects, in descending order of received levels Lv measured by the level measuring unit 134, small base stations TP up to the actual maximum RM set size, as small base stations TP with which the user device UE should maintain synchronization so as to store the transmission point identities TPI of the selected small base stations TP in the second list L2 (S160). For example, if the NW-derived maximum RM set size is "6" and the UE-derived maximum RM set size is "4", the base station selecting unit 138 determines the smaller size "4" as the actual RM set size. Then, the base station selecting unit 138 selects, in descending order of measured received levels Lv, from among small base stations TP included in the first list L1, four small base stations TP (the RM set) and stores their transmission point identities TPI in the second list L2.

Operations at and after step S170 are as described in the first example.

1-4. Advantages of Present Embodiment

According to the above configurations, from among small base stations TP (an SCM set) from which transmission point identities TPI are acquired by synchronization acquisition (i.e., small base stations TP that can perform radio communication with the user device UE), small base stations TP (an RM set) with which the user device UE should maintain synchronization are selected. In particular, according to the configuration of the first example, small base stations TP up to the number indicated by the NW-derived maximum RM set size are selected. Therefore, the number of small base stations TP that are selected as objects with which synchronization is to be maintained becomes more appropriate. Furthermore, according to the configuration of the second example, small base stations TP up to the number indicated by the smaller of the NW-derived maximum RM set size and the UE-derived maximum RM set size are selected. Therefore, the number of small base stations TP that are selected as objects with which synchronization is to be maintained becomes more appropriate.

That is, according to the above configurations, the size of the RM set (the number of transmission point identities TPI that the second list L2 includes) is set appropriately based on information that the network NW side (the small cell aggregating unit PhNB) has and information that the user device UE has. Moreover, since a set of small base stations TP is selected in two steps, compared with a configuration in which a set of base stations is selected based on a single criterion (e.g., based only on geographical location), more appropriate small base stations TP are selected.

Second Embodiment

Description is next given of a second embodiment of the present invention. In each embodiment described below, for elements for which operation and function are equivalent to those of the first embodiment, the reference symbols used in the above description are used, and description thereof will be omitted as appropriate.

In the dynamic selecting operation of small base stations TP in the first embodiment, the small cell aggregating unit PhNB generates the maximum RM set size (the NW-derived maximum RM set size) as selection information SI and reports it to the user device UE. In the second embodiment, the small cell aggregating unit PhNB reports, as selection information SI, candidates for small base stations TP that should be included in the RM set.

2-1-1. Dynamic Selecting Operation of Small Base Stations TP (First Example)

Figure 9:
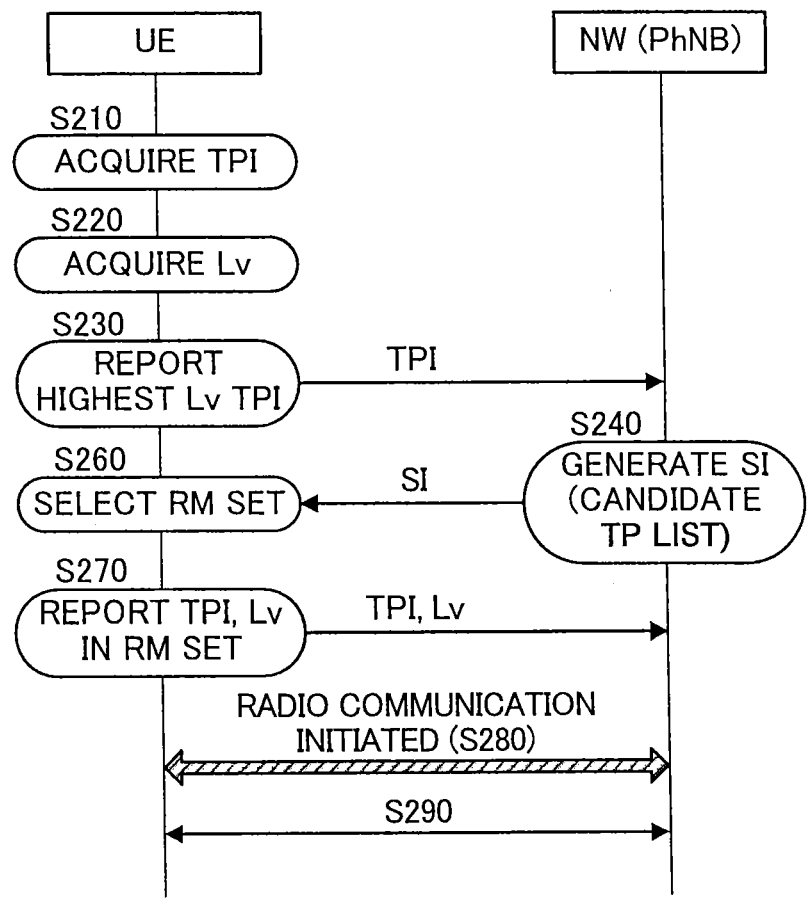
FIG. 9 is a diagram illustrating a first example of a dynamic selecting operation of small base stations according to a second embodiment.

With reference to FIG. 9, an example of a dynamic selecting operation of small base stations TP according to the present embodiment is described below. Since operations at steps S210 and S220 are similar to those at steps S110 and S120 in the first embodiment described above, description thereof is omitted. After step S220 is completed, the base station information reporting unit 140 of the user device UE identifies the highest received level Lv among received levels Lv of radio waves from small base stations TP that are measured by the level measuring unit 134 and stored in the storage unit 120. Then, the base station information reporting unit 140 retrieves a transmission point identity TPI of the small base station TP corresponding to the highest received level Lv from the storage unit 120 so as to report it to the small cell aggregating unit PhNB (S230).

The selection information generating unit 432 of the small cell aggregating unit PhNB selects candidates for small base stations TP that the RM set should include based on the transmission point identity TPI of the small base station TP reported by the user device UE. The selection information generating unit 432 then generates, as selection information SI, a list (candidate list) of transmission point identities TPI of the candidate small base stations TP (i.e., candidates for transmission point identities TPI of small base stations TP that the second list L2 should include). The selection information reporting unit 434 reports (transmits) the generated selection information SI to the user device UE (S240). The size of the candidate list included in the selection information SI is equal to the NW-derived maximum RM set size generated in the first embodiment (at step S140).

At step S240, the selection information generating unit 432 may select candidate small base stations TP based on a freely chosen criterion. For example, the selection information generating unit 432 may select, as candidates, small base stations TP that are geographically close to the small base station TP corresponding to the transmission point identity TPI reported by the user device UE. The selection information generating unit 432 may select, as candidates, small base stations TP that are in synchronization with the small base station TP corresponding to the transmission point identity TPI reported by the user device UE (or small base stations TP whose deviation in synchronization timing from that of the small base station TP corresponding to the transmission point identity TPI reported by the user device UE is less than a predetermined value). Alternatively, small base stations TP with low traffic loads may be selected as candidates. Small base stations TP that are grouped based on a specific condition may be selected as candidates. For example, small base stations TP that are temporarily set up at an event site such as a concert may be selected as candidates. Small base stations TP that are set up in a moving vehicle such as a train may be selected as candidates. Furthermore, candidate small base stations TP may be selected based on criteria that include any of the above criteria.

The base station selecting unit 138 of the user device UE selects, as small base stations TP with which the user device UE should maintain synchronization, small base stations TP corresponding to transmission point identities TPI indicated by the selection information SI (the candidate list) (S260). That is, the base station selecting unit 138 selects, as small base stations TP with which the user device UE should maintain synchronization, the candidate small base stations TP that the RM set should include and are indicated by the candidate list reported by the small cell aggregating unit PhNB. Then, the base station selecting unit 138 stores the transmission point identities TPI of the selected small base stations TP in the second list L2. Since operations at and after step S270 are similar to those at and after step S170 in the first embodiment described above, description thereof is omitted.

2-1-2. Dynamic Selecting Operation of Small Base Stations TP (Second Example)

Figure 10:
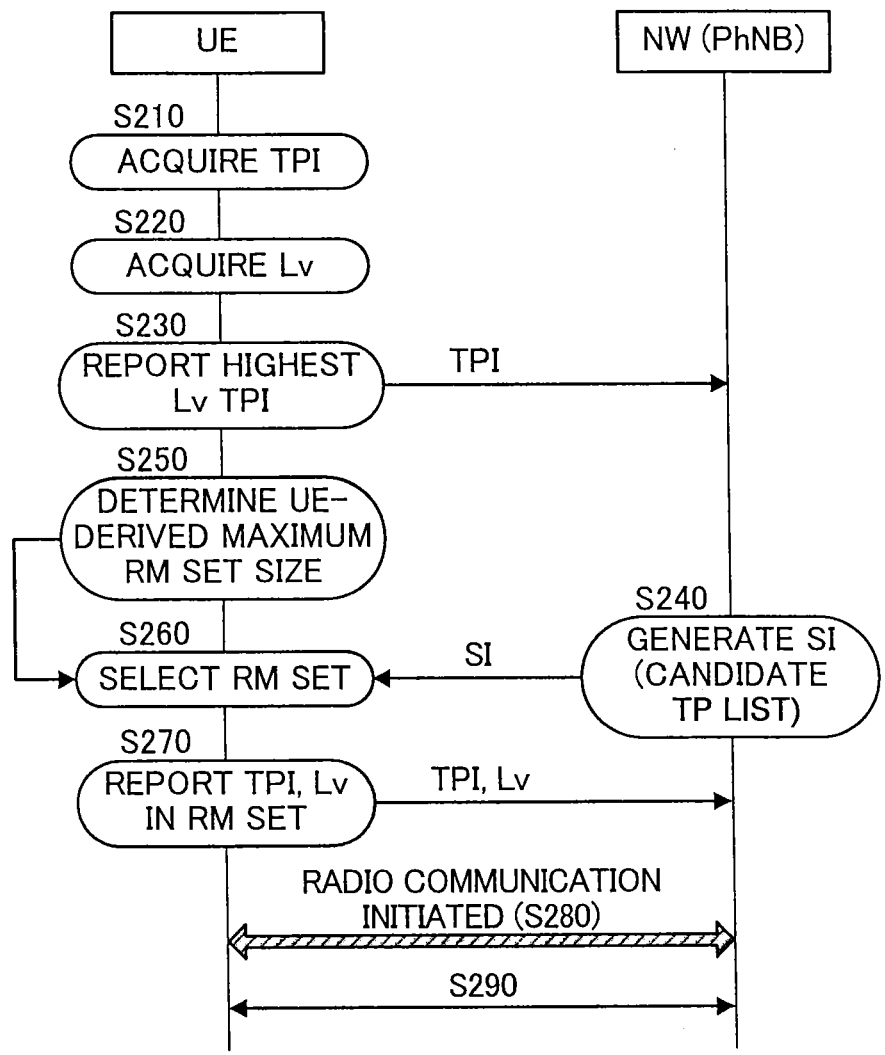
FIG. 10 is a diagram illustrating a second example of a dynamic selecting operation of small base stations according to the second embodiment.

FIG. 10 is another example (a second example) of a dynamic selecting operation of small base stations TP according to the present embodiment. Since operations at steps S210 through S230 are similar to those in the first example described above, description thereof is omitted. After the transmission point identity TPI corresponding to the small base station TP with the highest received level Lv is reported from the user device UE (after step S230 is completed), the selection information generating unit 432 of the small cell aggregating unit PhNB selects candidates for small base stations TP that the RM set should include. In the present example, the selection information generating unit 432, after selecting candidate small base stations TP based on a predetermined criterion as in the first example of the present embodiment, arranges (sorts) the selected small base stations TP in order of priority. That is, the selection information generating unit 432 generates, based on the reported transmission point identity TPI, as selection information SI, a candidate list in which candidates for transmission point identities TPI of small base stations TP that the second list L2 should include are arranged in order of priority (S240). The generated selection information SI is reported to the user device UE by the selection information reporting unit 434.

The priority of each small base station TP may be determined based on a freely chosen criterion. For example, if candidate small base stations TP are selected based on how geographically close they are to the small base station TP with the highest received level Lv, the closer a small base station TP is, the higher the priority that may be assigned to it. If candidate small base stations TP are selected based on synchronization timing, the closer the synchronization timing of a small base station TP is to that of the small base station TP with the highest received level Lv, the higher the priority that may be assigned to it. If candidate small base stations TP are selected based on traffic loads, the smaller the traffic loads are on a small base station TP, the higher the priority that may be assigned to the small base station TP. Priority may be assigned to small base stations TP based on any other freely chosen criterion. Priority may be assigned to small base stations TP based on criteria that include any of the above criteria.

After step S230, in a manner similar to step S130 in the second example of the first embodiment, the determining unit 136 of the user device UE determines the UE-derived maximum RM set size (S250). Then, at step S260, the base station selecting unit 138 selects, as small base stations TP with which the user device UE should maintain synchronization, small base stations TP up to the UE-derived maximum RM set size in order of priority indicated by the selection information SI (the candidate list), from among small base stations TP corresponding to transmission point identities TPI indicated by the selection information SI (the candidate list). After selecting the small base stations TP, the base station selecting unit 138 stores the transmission point identities TPI of the selected small base stations TP in the second list L2. Since operations at and after step S270 are similar to those at and after step S170 in the first embodiment described above, description thereof is omitted.

2-2. Advantages of Present Embodiment

The above configurations have advantages similar to those of the first embodiment. According to the configuration of the first example, the small cell aggregating unit PhNB (i.e., a node at the network NW side) selects candidates for small base stations TP that should be included in the RM set. Therefore, compared with a configuration in which the network NW side determines only the number of small base stations TP (the maximum RM set size), small base stations TP selected as the RM set are more suited to the state of the network NW side. According to the configuration of the second example, small base stations TP up to the UE-derived maximum RM set size are selected from candidates for small base stations TP that the network NW side has assigned priority to and has selected. Therefore, small base stations TP selected as the RM set are more suited to both the state of the network NW side and that of the user device UE.

3. Modifications

Various modifications may be applied to the above-described embodiments. Specific modifications are exemplified below. Two or more modes selected from among the above embodiments and the following examples may be combined as appropriate, provided that the combined modes do not conflict with each other.

3-1. Modification 1

The radio communication system CS (the network NW) in the above embodiments is a heterogeneous network that includes a macro base station eNB and a small base station TP. However, a homogeneous network that includes base stations NB of only a single type may be adopted.

3-2. Modification 2

The two selecting operations described in the first embodiment and the two selecting operations described in the second embodiment may instead be a combination of two or more of the selecting operations. In the first example of the first embodiment and in the first example of the second embodiment, the determining unit 136 of the user device UE is not an essential element. Therefore, if the configuration of the first example of the first embodiment only or the configuration of the first example of the second embodiment only is to be implemented, the determining unit 136 of the user device UE may be omitted.

3-3. Modification 3

In the above embodiments, while the level measuring unit 134 of the user device UE measures received levels Lv of radio waves transmitted from small base stations TP corresponding to transmission point identities TPI included in the first list L1 (i.e., small base stations TP in the SCM set) at a first frequence F1, the level measuring unit 134 preferably measures received levels Lv of radio waves transmitted from small base stations TP corresponding to transmission point identities TPI included in the second list L2 (i.e., small base stations TP in the RM set) at a second frequence F2 that is higher than the first frequence F1. According to the configuration above, received levels Lv of radio waves from the small base stations TP included in the RM set are measured more frequently. Therefore, scheduling of radio communication through a small base station TP included in the RM set can be performed more appropriately.

3-4. Modification 4

The user device UE is a freely chosen device that can perform radio communication with the macro base station eNB and small base stations TP. The user device UE may be a mobile phone terminal such as a feature phone and a smartphone, a desktop personal computer, a laptop personal computer, a UMPC (Ultra-Mobile Personal Computer), a portable game machine, or any other type of radio terminal.

3-5. Modification 5

In each of the elements in the radio communication system CS (the user device UE, the macro base station eNB, small base stations TP, the small cell aggregating unit PhNB), functions executed by the CPU may be executed instead by hardware or by a programmable logic device, such as an FPGA (Field Programmable Gate Array) or a DSP (Digital Signal Processor).

REFERENCE SYMBOLS

UE: User Device
110: Radio Communication Unit
120: Storage Unit
130: Control Unit
132: Synchronization Acquiring Unit
134: Level Measuring Unit
136: Determining Unit
138: Base Station Selecting Unit
140: Base Station Information Reporting Unit
142: Synchronization Maintaining Unit
eNB: Macro Base Station
210: Radio Communication Unit
220: Network Communication Unit
230: Storage Unit
240: Control Unit
TP: Small Base Station
310: Radio Communication Unit
320: Network Communication Unit
PhNB: Small Cell Aggregating Unit
410: Network Communication Unit
420: Storage Unit
430: Control Unit
432: Selection Information Generating Unit
434: Selection Information Reporting Unit
436: Scheduler
C: Cell
C1: Macro Cell
C2: Small Cell
CS: Radio Communication System
L1: First List
L2: Second List
Lv: Received Level
NB: Base Station
NW: Network
PCI: Physical Cell Identity
SI: Selection Information
TPI: Transmission Point Identity

The invention claimed is:

1. A radio communication system comprising:
   base stations that are identified by their respective identifiers;
   a user device that performs radio communication with each of the base stations; and
   a communication control device that controls radio communication between the base stations and the user device, wherein
   the user device comprises first circuitry configured to store a first list and a second list, the first list comprising identifiers of base stations that are wirelessly communicable with the user device, the identifiers having been acquired by synchronization acquisition, and the second list comprising identifiers of base stations with which the user device should maintain synchronization; and
   measure received levels of radio waves transmitted from each of the base stations that correspond to the identifiers in the first list,
   the communication control device comprises second circuitry configured to generate selection information that is used to select base stations with which the user device should maintain synchronization, the selection information indicating a first maximum number of the identifiers that the second list is allowed to comprise; and
   report the selection information to the user device,
   the first circuitry is further configured to determine, based on a state of the user device, a second maximum number of the identifiers that the second list is allowed to comprise;
   select, based on the selection information reported by the communication control device, base stations up to a lesser of the first maximum number and the second maximum number in a descending order of the measured received levels, base stations with which the user device should maintain synchronization from among base stations corresponding to the identifiers in the first list so as to store identifiers of the selected base stations in the second list;
   report, to the communication control device, the identifiers of the selected base stations the identifiers being in the second list, and received levels of radio waves transmitted from the base stations corresponding to the identifiers; and
   maintain synchronization with each of the base stations corresponding to the identifiers in the second list.

2. The radio communication system according to claim 1, wherein the first circuitry is configured to measure received levels of radio waves transmitted from the base stations corresponding to the identifiers comprised in the first list at a first frequency, and measure received levels of radio waves transmitted from the base stations corresponding to the identifiers comprised in the second list at a second frequency that is higher than the first frequency.

3. The radio communication system according to claim 1, wherein
the base stations comprise:
a first base station that forms a first cell; and
a second base station that forms a second cell that has a radius smaller than the first cell,
the second base station is connected to the communication control device, and
the communication control device controls radio communication between the second base station and the user device.

4. The radio communication system according to claim 3, wherein
the first base station performs radio communication with the user device using radio waves of a first frequency band, and
the second base station performs radio communication with the user device using radio waves of a second frequency band that is higher in frequency than the first frequency band.

5. A communication control method for a radio communication system, the radio communication system including base stations that are identified by their respective identifiers, a user device that performs radio communication with each of the base stations, and a communication control device that controls radio communication between the base stations and the user device, the communication control method comprising:
storing, by first circuitry of the user device, a first list and a second list, the first list comprising identifiers of base stations that are wirelessly communicable with the user device, the identifiers having been acquired by synchronization acquisition, and the second list comprising identifiers of base stations with which the user device should maintain synchronization;
measuring, by the first circuitry, received levels of radio waves transmitted from each of the base stations that correspond to the identifiers in the first list;
generating, by second circuitry of the communication control device, selection information that is used to select base stations with which the user device should maintain synchronization, the selection information indicating a first maximum number of the identifiers that the second list is allowed to comprise;
reporting, by the second circuitry, the selection information to the user device;
determining, by the first circuitry, based on a state of the user device, a second maximum number of the identifiers that the second list is allowed to comprise;
selecting, by the first circuitry based on the selection information reported by the communication control device, base stations UP to a lesser of the first maximum number and the second maximum number in a descending order of the measured received levels, base stations with which the user device should maintain synchronization from among base stations corresponding to the identifiers in the first list so as to store identifiers of the selected base stations in the second list;
reporting, by the first circuitry to the communication control device, the identifiers of the base stations in the second list and received levels of radio waves transmitted from the base stations corresponding to the identifiers; and
maintaining, by the first circuitry, synchronization with each of the base stations corresponding to the identifiers in the second list.

* * * * *